United States Patent

[11] 3,587,706

| [72] | Inventors | John R. Widmer;<br>Elva G. Widmer, 468 Abrams St., Green Bay, Wis. 54302 |
|---|---|---|
| [21] | Appl. No. | 817,463 |
| [22] | Filed | Apr. 18, 1969 |
| [45] | Patented | June 28, 1971 |

[54] AUTOMOBILE WINDOW SCREEN
14 Claims, 10 Drawing Figs.

[52] U.S. Cl. .................................................. 160/105, 160/354
[51] Int. Cl. .................................................. E06b 7/02
[50] Field of Search .......................................... 160/105, 354(Auto Screen Digest)

[56] References Cited
UNITED STATES PATENTS

| 1,651,839 | 12/1927 | Rogers | 160/Auto Screen Digest |
| 1,837,135 | 12/1931 | Pousha et al | 160/Auto Screen Digest |
| 2,643,711 | 6/1953 | Smith | 160/105 |
| 2,702,596 | 2/1955 | Morrow | 160/354 |
| 2,779,406 | 1/1957 | Merewether | 160/A.S.D. |
| 2,914,123 | 11/1959 | Deuble | 160/105 |
| 2,997,103 | 8/1961 | Buchanan | 160/105X |

*Primary Examiner*—Peter M. Caun
*Attorney*—Stanley E. Binish

ABSTRACT: An automobile window screen comprising a pliant mesh screen mounted across the face of a resilient thin strip U-shaped frame, said frame being adapted to seat on the web portions of the window guide channels of a conventional automobile window structure, and said frame being substantially as wide as the webs of said guide channels and being of a thinness adapted to occupy the space between the edges of the associated window glass and the webs of said guide channels, thereby permitting the window glass to be raised and lowered in said guide channels without interference of said window screen also disposed in said guide channels.

PATENTED JUN28 1971
3,587,706
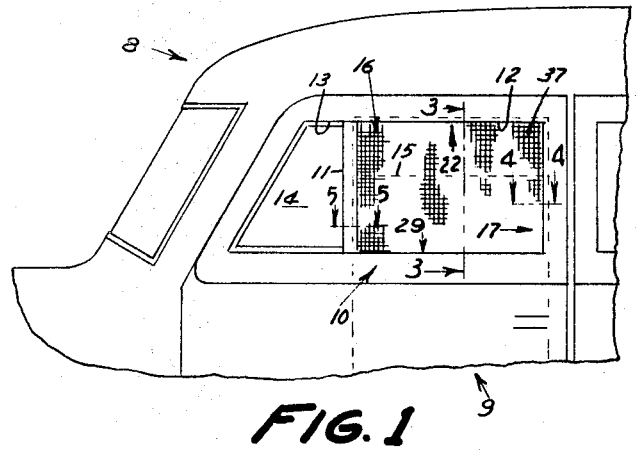
FIG.1
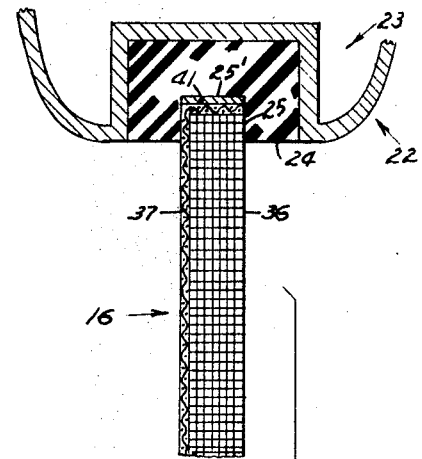
FIG.3
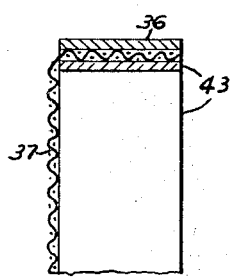
FIG.8
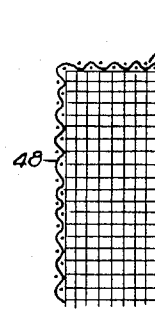
FIG.9
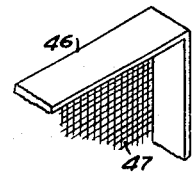
FIG.10
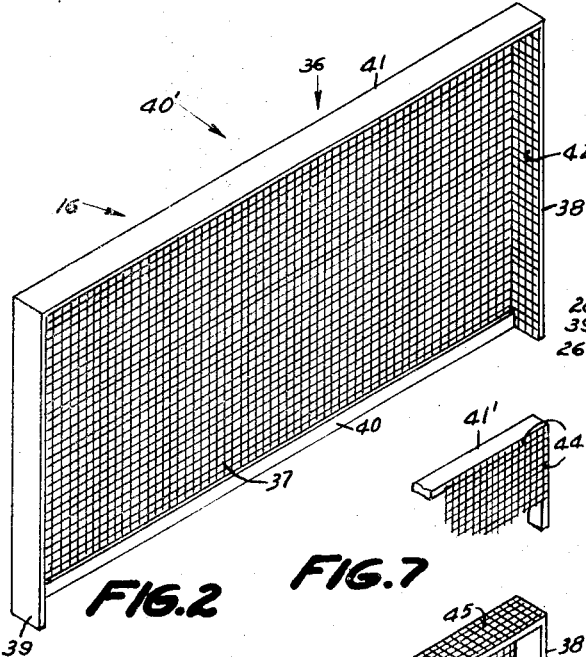
FIG.2
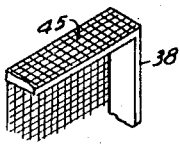
FIG.7
FIG.6
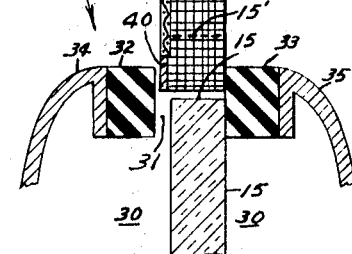
FIG.5
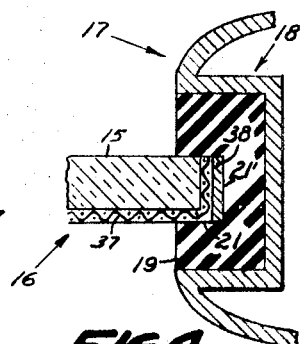
FIG.4
INVENTORS
JOHN R. WIDMER
ELVA G. WIDMER
BY
Stanley E. Bimish
ATTORNEY

AUTOMOBILE WINDOW SCREEN

The purpose of this invention is to provide an efficient, simple, inexpensive and economical window screen for automobiles, capable of quick and easy application to and removal from conventional automobile window structures.

Although other forms of automobile window screens have been proposed and provided in the past, practically none are seen to be in actual use, despite their great need to provide insect free ventilation especially during hot weather. Such nonacceptance by the automobile public is apparently due to the fact that the prior screens are unsuitable for the intended purpose and therefore unmarketable. The present invention makes novel use of the present built-in window guide channels to receive and retain the improved window screen in a most simple and facile manner, and provide a most inexpensive screen design therefor.

An object of this invention s the provision of an automobile window screen having a U-shaped flangelike frame, on one side of the screen panel, and said frame being of a thinness adapted to be disposed in the space between the webs of the guide channels and the edges of the window glass, and seat on said webs, of a conventional automobile window structure.

Another object is to provide an automobile window screen having a U-shaped flangelike frame, on one side of the screen panel, said flangelike frame being adapted to seat on the webs of the window guide channels of a conventional automobile window structure and said flangelike frame being substantially as wide as the webs of said window guide channels thereby disposing the mesh screen to one side of the window glass movably operable in said guide channels.

Yet another object of this invention is the provision of an automobile window screen, for a conventional automobile window structure, formed entirely of resilient wire mesh screen including an integral resilient wire mesh flangelike frame on one side of the screen panel, said flangelike frame being adapted to seat on the webs of the window guide channels of said window structure and being substantially as wide as said web seats.

Other specific features and many of the attendant advantages of this invention will be readily appreciated as the same becomes better understood by reference to the following detailed description when considered in connection with the accompanying drawings in which like reference numerals designate like parts throughout the FIGS. thereof and wherein:

FIG. 1 is a fragmentary side elevation view of an automobile illustrating a conventional door thereof having a window opening and showing the improved window screen of this invention applied to said window opening;

FIG. 2 is an enlarged perspective view illustrating the window screen, per se, and showing the U-shaped frame thereof;

FIG. 3 is an enlarged section view taken on line 3—3 of FIG. 1, showing the thin screen frame mounted in the upper window glass guide channel, and the lower door well slot;

FIG. 4 is an enlarged section view taken on line 4—4 of FIG. 1, showing the thin screen frame mounted in a vertical guide channel of the window structure together with the window glass therein;

FIG. 5 is an enlarged section view taken on line 5—5 of FIG. 1, showing the guide channel in the window post and both the glass and screen together occupying the guide channel;

FIG. 6 is a fragmentary perspective view of a modification showing the screen mesh bent over and secured to the outer periphery of the U-shaped screen frame;

FIG. 7 is a fragmentary perspective view of a modification showing a screen mesh panel secured to the face edges of a narrowed U-shaped screen frame;

FIG. 8 is a fragmentary view of a modification, similar to the section view of FIG. 3, showing the screen mesh bent over and sandwiched and secured between two U-shaped frames superposed astride one another;

FIG. 9 is a fragmentary view of a modification, similar to the view of FIG. 3, showing the window screen formed entirely of mesh screen including a U-shaped integrally formed mesh screen flange; and FIG. 10 is a fragmentary view, of a modification, similar to the view of FIG. 3, showing a resilient mesh screen mounted on a pliant U-shaped frame.

Referring now to the drawings, wherein like reference characters designate like or corresponding parts throughout the several views, there is shown a front end portion of a conventional automobile generally indicated at 8, see FIG. 1, having a conventional front door generally indicated at 9 including a window opening and a conventional frame structure therefor generally indicated at 10.

A post 11 separates the window opening 10 into two parts, part 12 and part 13. In the forward part 13 is mounted a revolvable vent window glass 14, and in the rearward part 12 is movably mounted, for vertical adjustment, a window glass 15.

A window screen, such as indicated generally at 16, is provided for the glass 15 opening, said screen comprising the improved invention hereinafter described in greater detail.

In for raising of the conventional automobiles the door window opening 12 is customarily framed and structured to provide guide channels to somewhat loosely and slidably receive the window glass 15 for raising or lowering of the window glass as desired.

The sheet metal exterior sheathing or door covering panel, at the right side or margin of the window opening, is rounded molded and framed, as generally indicated at 17, see FIGS. 1 and 4, to include an inwardly projecting vertical channel generally indicated at 18. Said sheet metal channel 17 is provided with a felt or rubber insert 19 having a vertical guide channel 21 formed therein to somewhat loosely and slidably receive an edge portion of window glass 15 therein.

The sheet metal sheathing at the top side or margin of said window opening is likewise rounded, molded and framed, as generally indicates at 22, to include an inverted horizontal channel generally indicates at 23, see FIG. 3. Said sheet metal channel 23 is provided with a felt or rubber insert 24 having an inverted guide channel 25 therein, in the plane of and communicating with the associated vertical channel 21, to somewhat loosely receive the top edge portion of the window glass 15 when the window glass is raised to a closed position.

The post 13, comprising the left side or margin of the window opening is likewise vertically channeled as at 26, see FIG. 5, and provided with a felt or rubber insert 27 having a vertical guide channel 28 therein, parallel to the associated vertical guide channel 21 on the opposite side of the window opening, an communicating with the inverted horizontal channel 25 on the top side of the window opening, to loosely receive the adjacent adjacent side edge portion of window glass 15 in such guide channel.

The above pair of spaced vertical guide channels 21 and 28 provide guide channels in which the side edge portions of the window glass 15 are slidably received and guided for vertical adjustment of said window glass 15 relative to window opening 12. The outline of the window glass conforms substantially in shape to the continuous profile of the bottom web portions or seats 21', 25', and 28', of the associated guide channels 21, 25 and 28, respectively.

The bottom side or margin, generally indicated at 29, of the window opening is formed and framed to provide an open slot as at 31, see FIG. 3, to allow the window glass to be raised and lowered therethrough, and lowered entirely and stored in the window well portion 30 of the conventional hollow door 11. The open slot 31 is lined with a pair of spaced rubber or felt elongated members 32 and 33 secured to the spaced window margin members 34 and 35, respectively.

In view of the fact that the above automobile door and adjustable window construction os conventional and well known, further detailed description thereof is deemed unnecessary.

The novel to improved window screen of this invention consists of a supporting U-shaped frame generally indicated at 36, see FIG. 2, on one side of which is mounted a panel of mesh screen 37, said frame being dimensioned to occupy the guide channels together with the window glass.

The U-shaped frame 36 consists of a thin narrow strip of flexible material such as the resilient side members 38 and 39, and a flexible connecting top member such as resilient member 41. The u-shaped frame 36 is formed and shaped to substantially conform to the outline or continuous profile of the channel web seats 21', 25', and 28', against which the U-shaped frame is resiliently urged and seated.

The width of said top and side members is substantially as wide as the web seats to automatically dispose the screen panel, hereinafter described, in a harmonious space relation outwardly of and adjacent the coexisting window glass, thereby to prevent the screen from interfering with or obstructing the movement of the window glass in its normal operation.

However, the invention is not limited to the aforementioned width of top and side members. Most any width less than the width of the webs can be used, that is, any width suitable for the intended purpose of seating the U-frame on the webs, see FIG. 7 for a narrower width construction. In the event a frame width less than the width of the webs is used, much more care must be exercised in installing and inserting the window screen in the guide channels to avoid interference with the raising of the window glass, as hereinafter described.

The thickness or thinness of the side and top members, comprising the U-shaped frame, is of a dimension adapted to be received in the space between the edges of said window glass 15 and the web of the associated guide channels, against which said side and top members are to seat, without interfering with the movement of the glass 15 in said guide channels.

As hereinbefore mentioned, the window glass 15 is somewhat loosely received in said guide channels and permits the insertion of the U-shaped frame in the space between the peripheral glass edges and the webs of the associated guide channels, thereby allowing the window glass to be operatively raised or lowered, normally.

The U-shaped frame is made of resilient or springy material, such as spring steel, or the like, to yieldably urge and bias its side members outwardly, thereby to cause said side members to yieldably expand and be pressed into seated engagement with the webs of said guide channels.

If desired, and to increase the bias of the U-shaped frame against the web seats, an elongated resilient thin strip member or rib 40, see FIGS. 2 and 3, can be disposed and secured across the bottom portions of the frame sides 38 and 39, said securement being by welding, or the like, at a face side of the frame generally indicated at 40'.

The mesh screen 37 is preferably made of a material that is suitably flexible, such as pliant plastic, textile fabric, or the like, which offer little or no resistance to the retractile deforming forces to be applied to the resilient frame 36 prior to the insertion of the frame into the guide channels, or to the expansibility of the resilient frame to its original shaped when the forces incident to insertion are removed, as hereinafter described. Said pliant mesh screen may be simultaneously flexed in transverse directions without taking a set.

Said screen panel 37 is disposed on the face side 40' of the U-shaped frame 36, see FIG. 2, and the outer edge portions of the screen are folded inwardly to overlay the inner periphery of the U-shaped frame, such as the inner surfaces of said members 38 and 39, and top member 41, as at 42, and secured thereto by any means such as by suitable adhesives. The bottom portion of the screen can be cemented to the face of the resilient rib 40 if the rib is present.

To provide a stronger and more durable framework, a second U-shaped frame 43, see FIG. 8, can be added, superposed on the folded edge portions of said screen and frame, and secured thereto by any means, such as riveting, adhesives, or the like.

In the alternative, the screen panel can be disposed in the plane of one of the faces of the U-shaped frame 36, and overlay the face edges thereof, as indicated at 44, see FIG. 7, and secured thereto as by adhesive. This construction provides additional frictional resistance to the edges of the frame to more securely hold the frame in the guide channels.

Alternatively, the mesh screen panel can be disposed to overlay one of the faces of the U-shaped frame, and the edge portions of the screen panel can be folded back over the outer periphery of the U-shaped frame, such as indicated at 45, see FIG. 6, and secured thereto as by adhesive. This construction imparts considerably additional frictional resistance to the outer periphery of the frame and thus more securely seats on the webs in its associated guide channels and prevents unwanted downward displacement of the frame relative to the guide channels in the event of unusual automobile vibrations.

A further modification is shown in FIG. 10 wherein the frame 46 is made of pliant material and the screen 47 is made of resilient material, in contradistinction to the aforementioned disclosure of FIG. 2 wherein the frame is resilient and the mesh screen is pliant.

Reference is now made to the modified construction of the window screen, disclosed in FIG. 9, made entirely of resilient wire mesh or the like. In this form a resilient mesh screen 46 is used as distinguished from a pliant mesh screen heretofore disclosed, and no separate frame is used, but the equivalent thereof is provided by bending and folding three edge portions of the screen panel backward substantially at right angle to provide an integral U-shaped flange or frame 47. Thus the required resiliency resides inherently in the wire mesh screen structure as a whole.

Operation. To install and insert the screen into the window frame guide channels, one merely lowers the window glass 15 to its lowers position, see FIG. 3, and standing outside the automobile and opposite said front door window glass, one grasps the U-shaped frame between one's hands, at the side members 38 and 39, respectively, with the top member 41 disposed upwardly and the screen outwardly of the automobile, and presses inwardly to deform and force said side members toward each other.

The above procedure distorts the resilient U-shaped frame to a somewhat narrower configuration. One then thrusts the slightly outwardly bowed top member 41 into the inverted upper guide channel 25 into seating engagement therein, and subsequently disposes the side members 38 and 39 adjacent their associated vertical guide channels 21 and 28, respectively, and thence pushes said side members into said vertical channels. The resiliency inherent in the U-shaped frame and the rib 40 causes the yieldingly expansible U-frame sides to be urged and resiliently retained in seating engagement with the web seats of the guide channels. The screen is thus seated and compatibly positioned in the same guide channels with the screen panel to one side of the glass as shown in FIG. 3, and permitting the window glass to move and function normally therein, without obstructing the movement of the glass, especially from a lowermost glass position.

In the event a U-frame width less than the width of the channel web is used, it is necessary that the window screen be inserted and positioned in the guide channels to one side thereof, so that the screen mesh is disposed outwardly of the glass, to avoid any possible interference with the raising of the window glass. In this situation the window glass is lowered only to position 15', see FIG. 3, leaving the top edge of the glass elevated above the lower side of the window frame. When the window screen is installed and inserted in the guide channels as above described, the bottom portion of the window screen is disposed against the face of said elevated glass portion. When the window glass is now raised, its upward motion tends to cam and crowd the window screen outwardly to its proper position, exteriorly of the window glass.

To remove the window screen, one lowers the window to its lowest position and pushes outwardly to the lower portion of the mesh screen. This causes the side members 38 and 39 of the U-shaped frame to be drawn toward each other and withdrawn from the low portions of the side channels. By continuing to push outwardly and also downwardly the window screen is thus entirely released from the guide channels, including withdrawal from the upper channel. The window screen structure is of a length extending substantially to the bottom of the window opening, and therebelow if desired, when the screen structure is fully seated in the upper guide channel, thereby substantially covering the window opening.

It is understood that the above window screens are not limited to automobile front door window openings only, but can also be applied to other windows of an automobile, truck, or the like, with equal facility.

Some characteristic features of this invention are the provision of an automobile window screen having a U-shaped flange frame on one side of the screen panel said frame being seatable in the same guide channels with the glass window and said flange frame being of a width substantially equal to the width of the guide channel webs, and of a thinness adapted to occupy the space between the glass edges and the guide channel webs of a conventional car window construction; and the provision of the above window screen formed entirely of resilient wire mesh screen, including an integral wire mesh flange or frame.

Obviously many modifications and variations of the present invention are possible in the light of the above teachings. It is therefore to be understood, that within the scope of the appended claims, the invention may be practiced otherwise than as specifically described.

We claim:

1. A window screen, for an automobile window structure having guide channels including webs and a window glass slidably mounted in said guide channels, comprising:
   a. a flexible U-shaped frame adapted to substantially conform to the continuous profile of said guide channel webs for reception in said guide channels and for seated engagement with said guide channel webs, the members of said frame being of a width substantially as wide as the webs of said guide channels, and the members of said frame being of a thinness adapted to be disposed between the webs of said guide channels and the adjacent edges of the window glass operable in said guide channels; and
   b. a flexible mesh screen panel disposed across one face of said U-shape frame and secured to said frame.

2. The window screen of claim 1 and an elongated flexible member connected across the bottom portions of the side members of said U-shaped frame, adjacent said one face, said flexible member being of a thinness substantially equal to the thinness of the members of said U-shaped frame, to avoid interference with the movement of the window glass.

3. The window screen of claim 1 wherein the flexible U-shaped frame is a resilient U-shaped frame, and the flexible mesh screen panel is a pliant mesh screen panel.

4. The window screen of claim 2 wherein the flexible member is resilient.

5. The window screen of claim 3 wherein the screen panel is extended over the outer periphery of said U-shaped frame and secured thereto.

6. The window screen of claim 3 wherein the screen panel is extended over the inner periphery of said U-shaped frame and secured thereto.

7. The window screen of claim 3 wherein the screen panel is secured to the adjacent face edges of the frame.

8. The window screen of claim 6 and a second resilient U-shaped frame superposed over the inner periphery of said U-shaped frame and the intervening screen panel therebetween and secured thereto.

9. A window screen, for an automobile window structure having guide channels including vertical guide channels having webs and a window glass slidably mounted in said guide channels, comprising:
   a. a resilient mesh screen panel; and
   b. a pliant U-shaped frame for said screen panel mounted on one side of said screen panel, said pliant U-shaped frame being adapted to substantially conform to the continuous profile of said guide channel webs for reception in said guide channels and to be urged and seated against said guide channel webs through the agency of said resilient screen panel, the members of said frame being of a width substantially as wide as the webs of said guide channels, and the members of said frame being of a thinness adapted to be disposed between the webs of said guide channels and the adjacent edges of the window glass operable in said guide channels.

10. A window screen, for an automobile window structure having guide channels including vertical guide channels having webs and a window glass slidably mounted in said guide channels, comprising: a resilient mesh screen panel having edge portions along three edges thereof bent back substantially at right angle to said screen panel to form a U-shaped mesh screen flange one side of said screen panel; said mesh screen flange being adapted to substantially conform to the continuous profile of the guide channel webs for reception in said guide channels and to be urged and seated against said guide channel webs through the agency of said resilient screen panel, the members of said U-shaped mesh screen flange being of a width substantially as wide as the web of said guide channels, and the members of said mesh screen flange being of a thinness adapted to be disposed between the webs of said guide channels and the adjacent edges of the window glass operable in said guide channels.

11. A window screen, for an automobile window structure having guide channels including vertical guide channels having webs and a window glass slidably mounted in said guide channels, comprising:
   a. a resilient mesh screen panel; and
   b. a pliant U-shaped frame for said resilient screen panel mounted on one side of said resilient screen panel, said assembled screen panel and U-shaped frame window screen unit having a width substantially as great as the distance between the webs of said vertical guide channels and said frame being adapted to substantially conform to and be received in said guide channels and be urged and seated against said guide channel webs through the agency of said resilient screen panel, the members of said U-shaped frame being of a width substantially as wide as the webs of said guide channels, and the members of said frame being of a thinness adapted to be disposed between the webs of said guide channels and the adjacent edges of the window glass operable in said guide channels.

12. The window screen of claim 11 wherein the assembled screen panel and U-shaped frame window screen unit has a width slightly greater than the distance between the webs of said vertical guide channels.

13. A window screen, for an automobile window structure having guide channels including vertical guide channels having webs and a window glass slidably mounted in said guide channels comprising: a resilient mesh screen panel having edge portions along three edges thereof bent back substantially at right angle to said screen panel to form a U-shaped mesh screen flange on one side of said resilient screen panel, said integral screen panel and U-shaped flange window screen unit having a width substantially as great as the distance between the webs of said vertical guide channels and said flange being adapted to substantially conform to and be received in said guide channels and be urged and seated against said guide channel webs through the agency of said resilient screen panel, the members of said U-shaped flange being of a width substantially as wide as the webs of said guide channels, and the members of said flange being of a thinness adapted to be received between the webs of said guide channels and the adjacent edges of the window glass operable in said guide channels.

14. The window screen of claim 13 wherein the integral screen panel and U-shaped flange window screen unit has a width slightly greater than the distance between the webs of said vertical guide channels.